J. F. GEYER.
MACHINE FOR FILLING BOTTLES, ETC.
APPLICATION FILED MAR. 27, 1922.
Reissued Sept. 26, 1922. 15,460.
3 SHEETS—SHEET 1.
Fig. I.
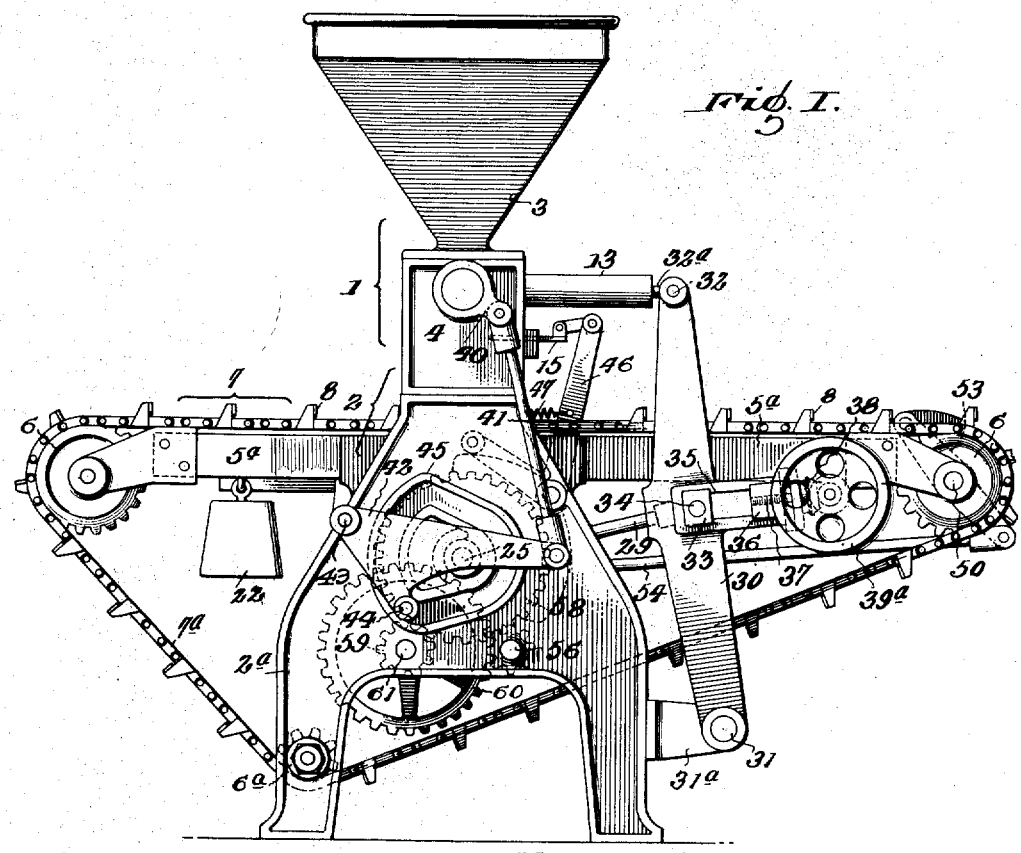
Fig. II.
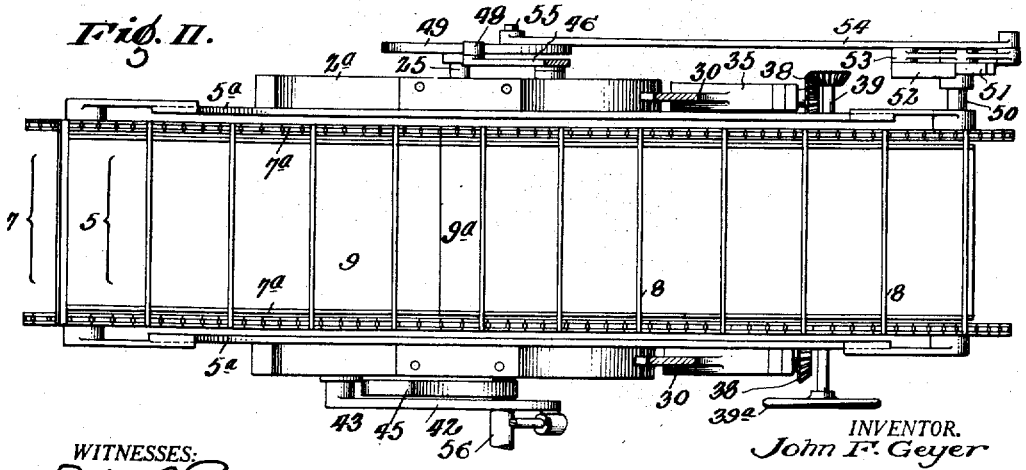
WITNESSES:
John C. Bergner.
Alfred E. Dechinger.
INVENTOR.
John F. Geyer
BY Fraley & Paul
ATTORNEYS.

J. F. GEYER.
MACHINE FOR FILLING BOTTLES, ETC.
APPLICATION FILED MAR. 27, 1922.
Reissued Sept. 26, 1922. 15,460.
3 SHEETS—SHEET 2.
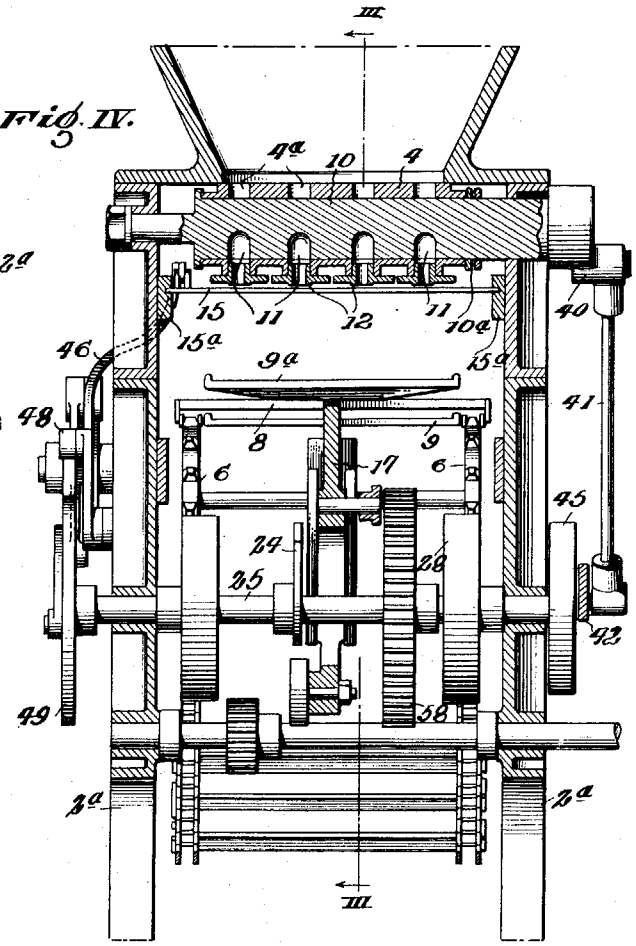
Fig. IV.
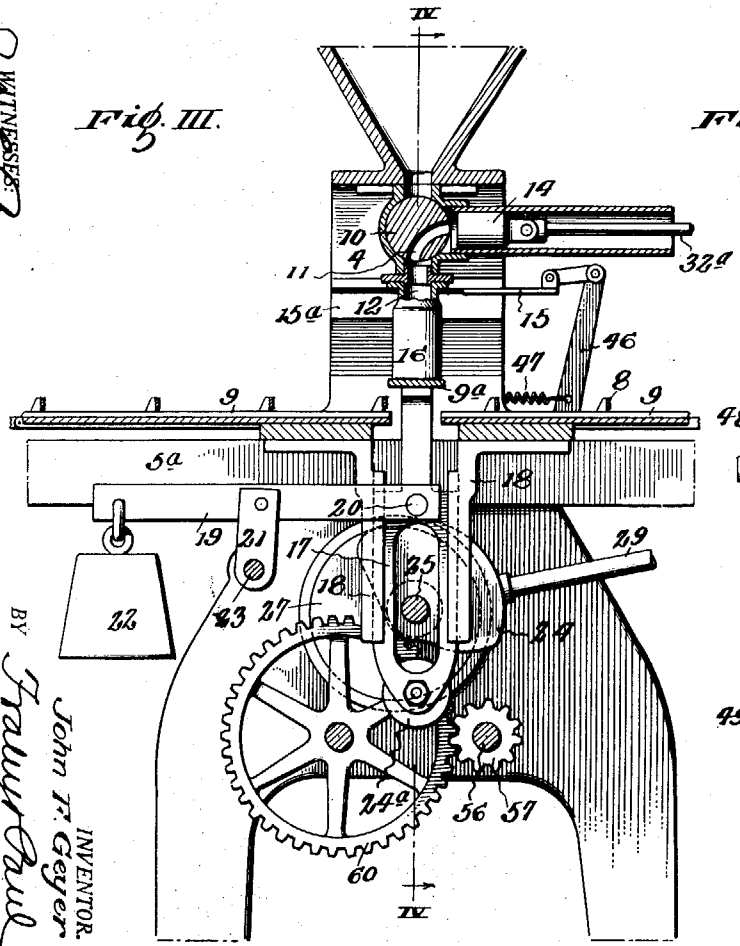
Fig. III.
INVENTOR.
John F. Geyer
BY Fraley & Paul
ATTORNEYS.
WITNESSES:
John E. Bergner
Alfred E. Oschinger J. F. GEYER.
MACHINE FOR FILLING BOTTLES, ETC.
APPLICATION FILED MAR. 27, 1922.
Reissued Sept. 26, 1922. 15,460.
3 SHEETS—SHEET 3.
FIG. VI.
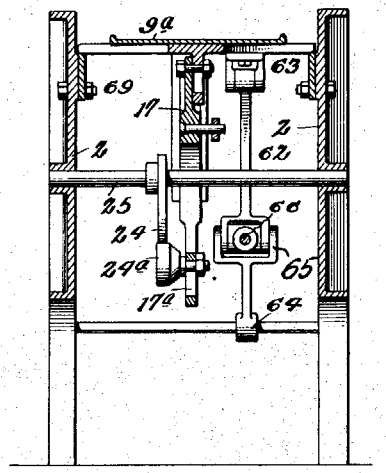
FIG. V.
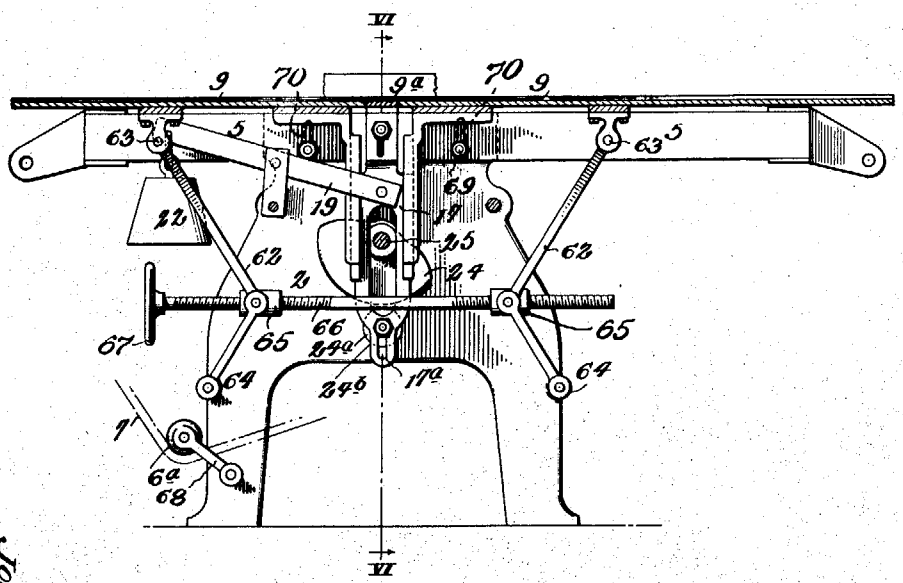
WITNESSES:
John C. Bergner.
Alfred E. Schlinger
INVENTOR.
John F. Geyer
BY Fraley & Paul
ATTORNEYS.

Reissued Sept. 26, 1922. Re. 15,460

UNITED STATES PATENT OFFICE.

JOHN F. GEYER, OF PHILADELPHIA, PENNSYLVANIA.

MACHINE FOR FILLING BOTTLES, ETC.

Original No. 1,401,150, dated December 27, 1921, Serial No. 189,304, filed September 1, 1917. Application for reissue filed March 27, 1922. Serial No. 547,251.

*To all whom it may concern:*

Be it known that I, JOHN F. GEYER, a citizen of the United States, residing at Philadelphia, in the county of Philadelphia and State of Pennsylvania, have invented certain new and useful Improvements in Machines for Filling Bottles, Etc., whereof the following is a specification, reference being had to the accompanying drawings.

The object of my invention is to provide machinery or apparatus suitable, especially, for filling bottles, jars, cans and similar vessels with material of a more or less viscous character, such as jellies, preserves, etc., which are sluggish in flow,—especially where the passages are relatively small. I aim to do this accurately, rapidly and automatically.

For the purpose of illustrating and explaining my invention, I have shown in the accompanying drawings a machine which is the best and most highly organized embodiment of the invention at present known to me, since it automatically performs all necessary operations of handling and feeding both the vessels to be filled and the filling material, as well as the introduction of the filling into the vessels in suitable amounts. In this particular machine, the filling material is positively withdrawn from the supply means or reservoir and delivered to the vessels in measured quantities,—with capacity or provision for adjustment of the quantity to suit bottles, jars, etc., of different dimensions. The material is first positively sucked out of a supply hopper or container, and then positively forced into the bottle, jar, or other receptacle in position to receive it; and the material is thus positively handled quite irrespective of its density, sluggishness, or resistance to flow under gravity. The vessels to be filled are progressed or fed along in an intermittent manner, under the control of a conveyor, and may be raised or elevated, in sets, to the delivery of the filling means. Preferably, the mechanism automatically accommodates bottles or jars of different heights, and insures that they shall in all cases be brought close to a filling or delivery nozzle.

It will be understood, however, that in its broader aspects, my invention is not confined to the particular machine or apparatus herein illustrated and described, but can be otherwise carried out and applied. And not only does the invention admit of embodiment in a variety of specific forms and details, but it also presents various novel features of operation and construction, and combinations and arrangements of parts and mechanisms, that are in themselves useful,—either alone, or in other connections, relations, or organizations than those here shown.

Referring to the drawings, Fig. I is a side elevation of a machine embodying my improvements.

Fig. II is a plan view of the same with the hopper and filling machinery removed.

Fig. III is a longitudinal sectional elevation of a portion of the machine taken on line III—III of Fig. IV.

Fig. IV is a transverse sectional elevation taken on line IV—IV of Fig. III.

Fig. V is a longitudinal sectional elevation of a portion of the machine indicating the construction when modified to provide vertical adjustment of the table; and Fig. VI is a transverse section of the same taken on line VI—VI of Fig. V.

The machine illustrated in the drawings has filling means generally and comprehensively indicated at 1, and comprising a reservoir or hopper structure 3 for the material to be handled, and subjacent pump means 13; a main frame, indicated at 2, which may be of any suitable construction; and means for supporting and progressing the vessels to be filled, here shown as comprising a table 9 and conveyor means 7 of the endless type. In the present instance, the main frame 2 includes upright side frames $2^a$, of general A shape, supporting the filling means 1 at their upper ends, and also a horizontal frame 5 (with side bars $5^a$) extended to each side of the frames $2^a$ (see Figs. I and III), for carrying the table 9 and the progressing means 7. The table 9 and the frame 5 project and overhang, cantileverwise, beyond the side frames $2^a$, without the encumbrance and complication of direct supports beneath their ends. As shown in Figs. III and IV, the filling means 1 is spanned or extends crosswise between the frames $2^a$, with flanges at the ends of the reservoir structure 3 resting on the tops of said frames, and with the filling pumps 13 extending lengthwise of the table 9 and the conveyor 7; and as shown in Figs. II, III and IV, the side bars $5^a$ and the table 9 lie (in part) between the frames $2^a$, and are supported by them. Beneath the table 9, between the same and the return run of the conveyor 7, is a transverse rotary shaft 25 (mounted in bearings on the frames $2^a$) whence may be actuated the filling means 1, the conveyor 7, and the various operating mechanisms and devices of the machine.

Vessels to be filled are placed on the table 9 and are engaged and moved over the table by transverse bars 8 attached to the endless sprocket chain belts $7^a$ of the conveyor means 7. There are two of these sprocket chains $7^a$, one at each side of the table 9, and said chains are guided over and around rotary sprocket wheels 6, 6, at the opposite ends of the table and of the frame bars $5^a$. Additional sprocket wheels $6^a$, supported from the lower portions of the frames $2^a$, are provided to control the sprocket chains $7^a$ at their lower portions or return runs beneath the table 9, and to guide them about the other machinery,—as will be understood by reference to Fig. I. For the purpose of driving the sprocket chains $7^a$, the sprocket wheels 6 at the right hand end of the machine, Fig. I, are secured to a shaft 50. Upon said shaft 50 is journalled a rocker arm 53 one end of which has a pawl 52 that engages a ratchet wheel 51 secured to the sprocket shaft 50. To the other end of the rocker arm 53 is pivoted a connecting link rod 54 which is actuated by a crank pin 55 on a rotating cam disk 49 on the shaft 25. Hence the rotation of the crank 55 will cause the sprocket shaft 50 to be intermittently rotated by the pawling mechanism, and the conveyor thus moved step by step with intervening dwells,—each movement being equal to the distance between two of the transverse bars 8 thereof. However, the intermittent operation of these sprocket chains may be produced in any other suitable manner, if so desired.

For the mechanism at 1 for handling the viscous material to be delivered to the bottles or receptacles, there is provided (see Figs. I, III, and IV) control valve mechanism whose substantially horizontal valve body or casing 4 lies below the hopper 3 and extends crosswise of the table 9 and the conveyor 7, and is bored out to receive a transversely extending rotary cylindrical valve device 10 having a plurality of curved passages 11. $10^a$ is a stuffing-box at one end of the body about the valve. The body casting 4 receives filling from the hopper 3 through inlet throats $4^a$ (at the top), which deliver the material into the curved passages 11 when the valve 10 is rotated through ninety degrees from the position shown in Fig. III,—at which time one end of the passages 11 will be directed to the throats $4^a$ and the other end will be directed horizontally into the end of the cylinders 13. These substantially horizontal cylinders 13 extend laterally from the body casting 4, which connects them with the supply means 3, and are provided with plungers 14. When the cylinder 10 is turned through ninety degrees from the position shown in Fig. III, and the plunger 14 is drawn outwardly or to the right, the material from the hopper will be drawn or sucked down through the passages 11 and into the cylinders 13, to an extent commensurate with the length of movement of the said plungers. When this operation has taken place, the valve cylinder 10 is returned through ninety degrees to the position indicated in Fig. III, and then the plungers 14 are moved inward or to the left and positively force the contents of the cylinders through the passages 11 and downward into the receptacles 16 which are at that time below the filling means in position to receive the material. In this manner, the material is positively handled and no dependence upon gravity action is required, and hence the machine is excellently adapted for the handling of products of a viscous character. The bottom portion of the body 4 of the valve device may be provided with outlet or delivery nozzles 12 screwed into place, and each having an annular flange against which the neck or inlet portion of the bottle, jar or other receptacle may be pressed in contact during the act of filling.

Immediately below the nozzles 12 a sliding cut-off plate 15 may be provided. This plate is guided at each side in guides $15^a$ on the frames $2^a$, and is shifted horizontally by a pivoted rocker arm 46, which is moved in one direction by a spring 47 and in the other direction by the cam 49 on the shaft 25 acting upon a roller 48 at the other end of said rocker arm 46. The shape and position of the cam 49 are such that when the bottles or receptacles 16 are being brought up into position to be filled, the plate 15 moves to one side as shown in Fig. III. When, on the other hand, the bottles 16 have been filled and are being lowered, the plate 15 is moved inward beneath the nozzles 12 and prevents any drippings from falling upon the bottles below and soiling them. The tendency to dripping will, of course, vary with the different materials being handled. With some materials, there would be no tendency to dripping at all, while in other cases, there might be some such tendency; and it is for this reason that this drip shield plate 15 is employed. While I have shown a reciprocating plate, it is manifest that this drip catcher may be arranged in other suitable ways so as to be shifted into and out of position at properly timed intervals.

For the operation of the filling pumps, the following mechanism may be employed:

As shown, especially, in Fig. I, levers 30 are arranged at the sides of the machine, with their lower ends pivoted or fulcrumed on a transverse shaft 31 that is mounted (in bearing brackets 31ᵃ) on the feet of the A frames 2ᵃ, below the table 9, and their free upper ends connected by a transverse rod or shaft 32,—the members 30 and 32 thus forming the legs and cross-bar of a sort of yoke-shaped structure straddling the table 9 and the conveyor 7. The pump plungers 14 are provided with operating rods or pitmen 32ᵃ, whose outer ends are connected to the transverse rod 32. As here shown, these operating connections are at the cylinder ends adjacent the yoke member 32, and the rods 32ᵃ push inward on the plungers 14 to force filling into the vessels to be filled. For variably operating the levers 30 and the filling means 1, there is a vibratory block-like member 33, cooperating with transverse guide means in the form of slotted slide-ways 35 with which the levers 30 are provided intermediate their ends. Besides the sliding block 33, abutment blocks 36 are arranged in the slots 35, to serve as adjustable end members for them. The sliding blocks 33 of the two levers 30 are interconnected by a transverse shaft member 34, and are actuated by eccentrics 27 secured to the rotating shaft 25, through connections comprising eccentric rods 29 extending from the eccentric straps 28 and pivoting at their other ends on the shaft 34. As shown, in Figs. I, III, and IV, the eccentrics 27 are located between the frames 2ᵃ, and the eccentric rods 29 extend beneath the table 9 to the shaft 34, by which they are connected to the levers 30 through the lost-motion means 33, 35, 36, somewhat below the table. When the eccentrics 27 move the shaft 34 and the blocks 33 to the right, no action upon the levers 30 takes place until the blocks 33 abut the blocks 36, and then, in the balance of such movement of the shaft 34, the levers 30 are swung to move the plungers 14 to the right from their positions corresponding to Fig. 1. When continued rotation of the eccentrics 27 then moves the blocks 33 to the left (Fig. III), the levers 30 remain stationary until the blocks 33 reach the other ends of the slots 35; and thereupon the levers 30 are moved in the reverse or left direction back to the position indicated in Fig. I. In this manner, the plungers 14 of the cylinders 13 are given an intermittent reciprocation; and the extent of this reciprocation may be adjusted by varying the effective length of the guideways 35 and the lost-motion represented by the maximum distance between the blocks 33 and 36. To shift and adjust the abutment blocks 36, for this purpose, I provide rotatable adjusting screws 37 which may be operated concurrently by miter gears 38 from a cross shaft 39 having the hand wheel 39ᵃ. By adjusting this hand wheel 39ᵃ and the blocks 36 thereby, the apparatus may be adjusted so that the plungers 14 will draw any definite amount of material desired from the hopper with each reciprocation, so as to properly fill bottles, jars or receivers of any definite cubical capacity. I have shown and described such mechanism for securing this adjustment of a character which I have found well adapted to the purpose, but it is to be understood that I do not limit myself to these devices, as any other suitable way of controlling the extent of movement of the plungers 14 may be resorted to if desired.

Considering now the means for elevating the bottles 16 to the nozzles 12 to receive the discharge therefrom, I have found the following devices suitable for the purpose: The table may be in two main portions 9, 9 separated by a gap equal to the width of a unitary transverse table portion 9ᵃ which is arranged immediately below the nozzles 12, and, as shown, is operated from beneath. When in lowered position, this table portion 9ᵃ is in alignment with the table portions 9, 9; and it is moved vertically by and with a subjacent yoke or frame 17 guided in suitable guides 18. During the dwell of the conveyor 7, this frame 17 and the table portion 9ᵃ are moved vertically upward between the bars 8 by a lever 19 pivoted at one end to the stud 20 on the frame 17, and provided at its other end with a weight 22,—the lever fulcrum 21 being pivoted at 23, to compensate for the rising and falling of the frame 17. The frame 17 is periodically moved in the opposite direction, to depress the table portion 9ᵃ down into alignment with the table portions 9, 9, out of the path of the vessels and permit their progression on and off of the table 9ᵃ, by a cam 24 operating upon a roller 24ᵃ journalled at the lower end of the frame 17,—there being clearance sufficient between this roller 24ᵃ and the small portion of the cam 24 when the table 9ᵃ and the cam are in their (Fig. III) positions to accommodate the smallest bottle or jar. It will be seen that as the cam 24 rotates, the transverse row or set of bottles or jars 16 then resting upon the table 9ᵃ will be lifted by the action of the weight 22 until the necks of said bottles come into contact with the flanges of nozzles 12, which arrests any further upward movement,—notwithstanding that the cam 24 continues to rotate and leaves the roller 24ᵃ (Fig. III). Hence the table 9ᵃ is yieldingly biased to automatically elevate the vessels to the filling means, and the elevating means is self-accommodating to variations in the height of the vessles; and in this manner various sizes of bottles or receptacles may be handled automatically with equal facility.

As shown, the cam 24 is secured to the transverse shaft 25 between the eccentrics 27 before referred to. This shaft 25 is extended out through the frames 2ᵃ; and outside one of them it carries the cam and crank disk 49 which has been before referred to as operating the drip slide 15 and the pawling mechanism 51, 52. This shaft 25 carries a gear 58, and is driven by means of a pinion 59 meshing with said gear. The pinion 59 is secured to a transverse shaft 61 which is provided with a gear 60. Meshing with this gear 60 is a driving pinion 57 which is secured to a transverse shaft 56, said shaft 56 being a power shaft which may be driven by any suitable means (not shown). The gearing just described is mounted between the A frames $2^a$, above the return run of the conveyor 7, and the shafts 56 and 61 are mounted in bearings low down on the intermediate portions of the frames, below the shaft 25 and its actuating means 24, 27.

Heretofore, I have referred to the rotation or oscillation of the valve 10 through ninety degrees, first in one direction and then in the other; and I will now describe the means by which this valve is actuated, and its timed operation accomplished. The valve 10 extends out beyond and to one side of the corresponding frame $2^a$, and is provided with a crank 40. To this crank 40 is pivoted a connecting link rod 41, the lower end of which is pivoted to a lever 42 pivoted or fulcrumed on said frame $2^a$ at 43. This lever 42 is provided with a roller 44 working in the facial or lateral groove of a cam 45 that is secured to the opposite end of the shaft 25 from the cam 49 outside the corresponding frame $2^a$. It will now be seen that as the shaft 25 and its cam 45 rotate, the cooperating lever 42 will be actuated and swung up and down beside the table 9, $9^a$, substantially parallel therewith. The valve 10 will be given rotary movements through ninety degrees, and will have a dwell at the end of each movement,—that is to say, a dwell during the time the material is being sucked out of the hopper 3 by the action of the plunger 14, and a dwell during the time that the material is being forced by the plunger 14 into the bottle 16. In other words, there are four cycles of operation, two of which are occupied by the flow of the material and the operation of the pump means for producing such flow; whereas the remaining two cycles are occupied by bringing the bottles or jars into position for receiving the material and the operation of the common valve 10 to deliver the material to the bottle or jar on the one hand, and by the lowering and removal of the filled bottles and the operation of the valve 10 to permit the passage of the material from the hopper to the cylinders on the other hand. The filling means 1 and elevating means $9^a$ are operated to elevate and deliver filling to the vessels alternately with the operation of the pawling mechanism and the conveyor 7 to progress the vessels.

As all of the various devices are actuated from the same rotating shaft 25, it is manifest that the definite timing or correlative operation of the various mechanisms and movable parts 7, 14, 10, $9^a$, 15, etc., of the machine is accurately assured. It is manifest that these various details of the operating mechanism may be greatly modified so long as the specific movements of the essential parts are imparted and in the proper timed relation, and I, therefore, do not restrict myself to the mechanism which is given by way of example.

Ordinarily, the capacity for adjustment to different sizes of bottles shown in the machine illustrated in Figs. I to IV is amply sufficient. Nevertheless, for cases where a greater variation in the height is necessary, I provide means for adjusting the whole horizontal structure or table 5, 5, 9, 9 vertically to some extent, so that the range of adjustment to be covered by the movable table part $9^a$ need not be extreme. This modification of the table adjustment is shown in Figs. V and VI. In this construction, the parts, 5, 5, 18, and 9, 9 are all adjustable vertically on the main frame 2. The means employed for this purpose are two toggles 62, the upper ends of which are pivoted at 63 to the table structure, while the lower ends are pivoted at 64 to the main frame 2. The toggles 62 are arranged in opposite directions and their middle or jointed portions 65 are connected by an adjusting screw-threaded shaft 66 having a hand wheel 67,—the screw threads being arranged right and left handed. In this manner, the adjustment of the toggles simultaneously will raise or lower the table structure to the degree desired. The sprocket wheels and chains are movable with the table so that there are no changes in respect to them. The lower guide wheels $6^a$ for the sprocket chains 7 may be carried on adjustable arms 68 mounted on the lower or foot portions of the frames $2^a$. As the shaft 25 is journalled in the main frame 2, it is manifest that the cam 24 may be changed to suit the different adjustments and sizes of bottles to be filled where very great variation is required; but instead of this, also, the roller $24^a$ may be set lower down on the frame 17, by means of the stud $24^b$ and slot $17^a$, to compensate for the degree of vertical adjustment given to the table in an upward direction, so that the cam 24 shall operate properly under all conditions of table adjustment. When the table is brought to the proper vertical adjustment, it may be steadied by tightening clamping screws 69 so as to relieve any strain upon the toggles.

As here shown, these screws or bolts 69 are mounted in holes in the side bars of the frame 5, and extend through slotted portions 70 of the side frames. This engagement at 69, 70 guides the horizontal structure 5 in its up or down movement. Any other suitable manner of adjusting the table vertically may be employed, if so desired.

Having thus described my invention, I claim:

1. A machine of the character described comprising endless conveyor means for progressing vessels to be filled; filling pump means over said conveyor means, with substantially horizontal cylinders, and with rotary control valve means with axis extending transversely of said conveyor means; and means for operating said conveyor, pump, and valve means in definite correlation with one another.

2. A machine of the character described comprising endless conveyor means for progressing vessels to be filled, with means including pawling mechanism for driving said conveyor means; filling means over said conveyor means, including pumps with common control valve device; and a transverse shaft beneath the active run of said conveyor means, with separate actuating connections therefrom to said pawling mechanism, pumps, and valve device.

3. A machine of the character described comprising a table for vessels to be filled; endless conveyor means for progressing vessels along said table, with guide and rotary drive means at the ends of the table, and return run beneath it, and with pawling mechanism for said rotary drive means; filling pump means extending lengthwise of and over said table, with control valve means extending cross-wise thereof; means including swinging levers at the sides of the table for actuating said pump means; and a transverse shaft beneath the table, with actuating connections to said pawling mechanism, said levers, and said valve means.

4. A machine of the character described comprising filling means, including pump means and controlling valve means therefor; upright side frames supporting said filling means; means between said side frames for progressing vessels to be filled beneath said filling means; and a transverse shaft with actuating means thereon for the valve means outside one of said frames, for the progressing means outside the other frame, and for the pump means between the frames.

5. A machine of the character described comprising a table with supporting side frames; filling means thereover, including pumps and controlling means therefor; means for progressing vessels to be filled along said table; and a transverse shaft beneath said table with actuating means thereon for the valve means outside one of said frames, for the progressing means outside the other frame, and for the pumps between the frames.

6. A machine of the character described comprising upright side frames; endless conveyor means for progressing vessels to be filled between said frames; means including pawling mechanism for driving said conveyor means; filling means supported by said side frames over said conveyor means, including pump means and rotary control valve means therefor with axis extending transversely of said conveyor means; and a transverse shaft with actuating means thereon for the valve means outside one of said frames, for the pawling mechanism outside the other frame, and for the pump means between the frames.

7. A machine of the character described comprising upright side frames; means for progressing vessels to be filled between said frames; filling pump means supported by said side frames over said progressing means, with substantially horizontal cylinder extending lengthwise thereof, and with controlling valve means extending transversely of said progressing means; a swinging yoke structure straddling said progressing means fulcrumed to said side frames therebelow, with connection from its transverse member to said pump means; and a transverse shaft below said progressing means, with actuating means thereon for the valve means outside one of the frames, for the progressing means outside the other frame, and for said yoke structure between the frames.

8. A machine of the character described comprising conveyor means for progressing vessels to be filled; filling pump means extending lengthwise of and over said conveyor means; a swinging yoke structure straddling said conveyor means and fulcrumed at the sides thereof, with connection from its own transverse member to said pump means; and means for actuating said conveyor means and said yoke structure to progress the vessels and to deliver filling thereto alternately.

9. A machine of the character described comprising upright A frames and a table for vessels to be filled supported by and between them, with its ends projecting cantilever-wise and overhanging unsupported; filling means spanned between the upper ends of said A frames over said table; endless conveyor means between said A frames, with transverse bars for progressing the vessels along said table, and with its return run therebeneath; a transverse shaft mounted in bearings on said A frames, between the table and the return run of the conveyor, with actuating means thereon for said filling and conveyor means; and gearing for driving said shaft mounted between said A frames, above the return run of the conveyor, including gears with transverse shafts in bearings low down on the intermediate portions of the A frames, below said first-mentioned shaft and its means for actuating the filling means.

10. Filling apparatus of the character described comprising means for supporting vessels to be filled; filling means, with rotary valve means extending crosswise of and over said supporting means, and with substantially horizontal pump cylinder extending laterally from said valve means; a swinging yoke structure straddling said supporting means, with its legs fulcrumed at the sides thereof, and with operating connection between the pump plunger and the transverse yoke member at the cylinder end adjacent the latter; and a transverse shaft below said supporting means, with actuating connection to said valve means and said yoke structure.

11. In filling apparatus of the character described, the combination of means for supporting vessels to be filled; filling pump means with cylinder extending lengthwise of and over said supporting means; and means for operating said pump means including a swinging yoke structure straddling said supporting means, with its legs fulcrumed at the sides thereof, and with operating connection between the pump plunger and the transverse yoke member at the cylinder end adjacent the latter.

12. In filling apparatus of the character described, the combination of means for supporting vessels to be filled; filling means thereover, including pump means, with plungers, extending lengthwise of said supporting means; and means for operating said pump means including a yoke structure with its legs fulcrumed at the sides of said supporting means and pitmen for pushing inward on the pump plungers, to force filling into the vessels, connected to the transverse member of the yoke.

13. In a machine of the character described, the combination of upright A frames; filling means, including a reservoir structure for filling spanned between the upper ends of said A frames, and pump means with plungers, and with cylinders extending laterally from said reservoir structure; levers with fulcrums for their lower ends on the feet of said A frames, and a transverse member connecting their upper ends; and means of connection from said member to the pump plungers.

14. In a machine of the character described, the combination of means for supporting vessels to be filled; filling means thereover; and means for variably operating said filling means including a vibratory member and a member fulcrumed at the side of said supporting means at one end and connected to said filling means at the other end, and having intermediate transverse guide means for said vibratory member adjustable to permit more or less lost-motion of the vibratory member therealong.

15. In a machine of the character described, the combination of means for supporting vessels to be filled; filling means thereover; and means for variably operating said filling means, including vibratory members, a yoke structure with cross-member connected to said filling means and legs fulcrumed at the sides of said supporting means and having transverse guide means for said vibratory members, movable end members for said guide means with rotary screw mechanism for shifting them, and a cross shaft geared to both of said screw mechanisms for concurrently adjusting the effective length of the guides at opposite sides of the yoke.

16. In a machine of the character described, the combination of side frames, and means for supporting vessels to be filled between them; filling means thereover; members forming a yoke structure straddling said supporting means and fulcrumed therebelow, with operating connection from the transverse member of the yoke to said filling means; and a transverse shaft beneath said supporting means, with actuating means thereon between said frames and connection therefrom to the yoke below said supporting means.

17. Filling apparatus of the character described comprising filling supply means; subjacent pump means with substantially horizontal cylinder for drawing filling down from said supply means and forcing it into vessels to be filled therebeneath; and substantially horizontal rotary valve means at the juncture of said supply means and cylinder for controlling their intercommunication, and also the delivery to the vessels to be filled.

18. Filling apparatus of the character described comprising a filling supply reservoir and a subjacent valve casing receiving filling from said reservoir, with delivery nozzle means for filling vessels therebelow; pumps with substantially horizontal cylinders extending laterally from and opening into said valve casing; and a rotary valve in said casing for controlling communication of the cylinders with reservoir and nozzles.

19. Filling apparatus of the character described comprising means for supporting vessels to be filled and an upright frame at one side thereof; filling means, including a reservoir structure for filling supported by said frame, a valve casing subjacent to said reservoir structure and receiving filling therefrom, pump means with cylinder extending laterally from said valve casing, and a rotary control valve for said pump means in said casing with a part extending out beyond the aforesaid frame; and means on the outer side of said frame for actuating said part to operate the valve.

20. Filling apparatus of the character described comprising filling means, and an upright side frame supporting said filling means; a rotary cam with lateral groove at the outside of said frame from said filling means; a lever fulcrumed on said frame to swing substantially parallel therewith, with a roller thereon working in the cam groove; and operating connection from said lever to a part of the filling means.

21. Filling apparatus of the character described comprising means for supporting vessels to be filled, and filling means thereover including a rotary valve device extending transversely and to one side of said supporting means; a transverse shaft beneath said supporting means with a cam thereon, and a cooperating lever actuated thereby to swing up and down at the same side of said supporting means; and operating connection from said lever upward to said valve device.

22. In a machine of the character described, the combination of upright side frames with filling means supported by their upper ends; horizontal side bars supported projecting caltileverwise from said frames below said filling means, with rotary sprockets at their unsupported overhanging ends; endless conveyor means for progressing vessels to be filled beneath said filling means, including sprocket chains on said sprockets between said frames; and means for controlling the chains comprising sprockets supported from said frames below said side bars and engaging the return runs of the chains.

23. In a machine of the character described, the combination of a table for vessels to be filled with a transverse gap therein, and filling means thereover; endless belts with transverse bars for progressing the vessels along said table beneath said filling means in transverse rows; and a unitary transverse table portion in said gap unitarily guided and movable upward from beneath between said bars, to raise the row of vessels thereon to said filling means.

24. A machine of the character described comprising a main frame with upright side frames; filling means supported by the side frames; means for progressing vessels to be filled between the side frames beneath said filling means, including a horizontal structure movable up or down relatively to said main frame with means of engagement between said horizontal structure and the side frames for guiding said structure in its up or down movement, and endless conveyor means carried by said structure and guided around its opposite ends; means for actuating said filling and conveyor means in definite correlation with one another mounted in bearings in the side frames below said horizontal structure; and adjustable means connected between said main frame and said horizontal structure for raising and lowering the latter to adjust the machine to vessels of various heights.

25. A machine of the character described comprising a main frame with upright side frames; filling means supported by the side frames; means for progressing vessels to be filled between the side frames beneath said filling means, including a horizontal structure movable up or down relatively to them and endless conveyor means carried by said structure and guided around its opposite ends; and means for raising or lowering said horizontal structure, including toggles connected between the same and said main frame.

26. A machine of the character described comprising a main frame with upright side frames; means for progressing vessels to be filled between the side frames, including a horizontal structure movable up or down relatively to them, and endless conveyor means carried by said structure; filling pump means supported by said side frames over said progressing means, including cylinders extending lengthwise of the latter, and rotary control valve means with axis extending crosswise thereof; means for operating said conveyor, pump, and valve means in definite correlation with one another; and means for adjusting the machine to vessels of different heights operatively connected between said horizontal structure and said main frame.

27. A machine of the character described comprising a main frame with upright lateral A frames; means for supporting and progressing vessels to be filled between said A frames, including a horizontal structure guided for up or down movement relatively to them, and endless conveyor means associated therewith; filling means supported by the upper ends of said A frames, including pumps, with plungers, extending lengthwise of and over said vessel-supporting and progressing means, and rotary controlling valve means extending cross-wise thereof; a swinging yoke structure straddling said vessel-supporting and progressing means, with its legs fulcrumed on the feet of said A frames, and with operating connections between the pump plungers and the transverse yoke member at the cylinder ends adjacent the latter; actuating means for said conveyor means, yoke structure, and valve means mounted in bearings on the main frame below said horizontal structure, with operating connection from between said A frames to said yoke structure below said horizontal structure; and means for raising or lowering the vessel supporting means connected between said horizontal structure and the feet of said A frames.

28. In a machine of the character stated, the combination of a hopper, a nozzle below the hopper, gravity actuated means to raise a receiving vessel into adjustment with the nozzle, a cylinder, a valve device between the hopper and the nozzle for shutting off the direct communication between said parts and for providing communication alternately from said parts to the cylinder, a plunger in the cylinder for withdrawing the material through the valve into the cylinder and discharging the material from the cylinder through the nozzle, and power devices for lowering the gravity actuated means and the receiving vessel.

29. In a machine of the character stated, the combination of a hopper, a nozzle below the hopper, means to bring a receiving vessel under the nozzle and automatically raise the vessel to the nozzle, a cylinder, a valve device arranged horizontally between the hopper and the nozzle and at right angles to the cylinder for shutting off the direct communication between said parts, but having a port which is alternately brought into communication with the hopper and with the nozzle to provide alternately communication from said parts to the cylinder, a plunger separate from the valve movable in the cylinder for withdrawing the material from the hopper through the valve into the cylinder and discharging the material from the cylinder through the valve and nozzle, and means for rotating the valve alternately in opposite directions and for reciprocating the plunger, the said operations of the valve and the plunger being so timed as to occur alternately.

30. In a machine of the character stated, the combination of a hopper, a plurality of nozzles below the hopper, means to bring a plurality of receiving vessels beneath the nozzles, a plurality of parallel cylinders, a rotary valve device arranged transversely across all of the cylinders and common to them all, said valve device being between the hopper and the nozzles and having ports which are alternately brought into communication with the hopper and with the respective nozzles and provide communication alternately from said parts to the respective cylinders, a plunger in each of the cylinders for withdrawing the material from the hopper through the valve into the cylinders and discharging the material from the cylinders through the valve and nozzles, operative means for rotating the valve alternately in opposite directions and for simultaneously reciprocating the plungers, the said operations of the valve and the plungers being in timed relation so as to occur alternately, and means for raising and lowering a plurality of the vessels to be filled to and from the nozzles in timed relation so that the receptacles shall be in position to receive the material when the plungers discharge it from the cylinders through the nozzles.

31. In a machine of the character stated, the combination of a hopper, a nozzle below the hopper, means to bring a receiving vessel beneath the nozzle, a cylinder, a valve device between the hopper and the nozzle for providing alternate communication from said parts to the cylinder, a plunger in the cylinder for withdrawing the material through the valve into the cylinder and discharging the material from the cylinder through the nozzle, means for rotating the valve alternately in opposite directions and for reciprocating the plunger, the said operations of the valve and the plunger being timed to occur alternately, means for automatically raising and lowering the vessels to be filled to and from the nozzles in timed relation so that the receptacle is in position to receive the material when the plunger discharges it from the cylinder through the nozzle, means for catching the drip from the nozzle when the vessel operating means is lowered, and mechanism whereby said means for catching the drip is moved away from under the nozzles when the means for raising the vessels is operated to bring the vessels into operative relation with the nozzles.

32. In a machine of the character stated, the combination of a hopper, a nozzle below the hopper, means to bring a receiving vessel into adjustment with the nozzle, a stationary cylinder, a valve device additional to the cylinder arranged transversely thereto between the hopper and the nozzle for shutting off direct communication between said parts, but providing communication alternately from said parts to the cylinder, a plunger in the cylinder for withdrawing the material through the valve into the cylinder and discharging the material from the cylinder through the nozzle, means for reciprocating the plunger, means for adjusting the extent of reciprocation to control the amount of material discharged at each operation, gravity actuated means for raising the vessel to be filled to the nozzle and holding it while being filled, and power devices operating upon the means for raising the vessel for positively lowering the vessel away from the nozzle against its tendency to remain elevated, said raising means automatically compensating for variation in height of vessels to be filled.

33. In a machine of the character stated, a hopper having a nozzle at its lower part, mechanism between the hopper and the nozzle for withdrawing measured quantities of the material from the hopper and discharging it positively from the nozzle, adjustable means for varying the quantity of material so discharged at each operation, gravity actuated means for raising and holding a receiving vessel to definite position with respect to the nozzle during the discharging operation, and power devices for controlling the time of operation of the gravity actuated means and for positively lowering the said means after the vessel has been filled.

34. The combination of a hopper and a nozzle therefor, means between the hopper and the nozzle for withdrawing a measured quantity of the material from the hopper and positively discharging it through the nozzle, a table for the vessels to be filled, endless conveyors for moving the vessels along the table successively into position beneath the nozzle, a vertically movable table portion for raising the vessel to be filled upward to definite position with respect to the nozzle, gravity actuated means for moving the table portion and the vessel vertically whereby vessels of various sizes may be adjusted to the nozzle automatically, and cam devices for positively moving the table portion downward to alignment with the table against the action of the gravity actuated means.

35. In a machine of the character stated, the combination of a hopper, a plurality of nozzles below the hopper, means between the hopper and the nozzles for withdrawing a measured quantity of the material from the hopper and positively discharging it through the nozzles, a table arranged at a lower level than the nozzles, endless belt means for feeding a plurality of receiving vessels along the table beneath the nozzles, means for intermittently operating said belt means, and means for adjusting the table and the vessel-feeding means simultaneously to or from the nozzles.

36. The invention according to claim 35 further characterized by elevating means carried by the table for raising the vessels to be filled to a higher elevation than the level of the table and to definite position with respect to the nozzles, and means in addition to the adjusting means for the table for controlling the movement of the elevating means.

37. The invention according to claim 35 wherein the means for adjusting the table comprises two oppositely directed toggles and an adjusting screw for drawing the toggles toward or from each other.

38. In a machine of the character stated, the combination of a hopper, a plurality of nozzles below the hopper, a plurality of cylinders, a rotary valve device arranged transversely across all the cylinders and common to all of them, said valve device being between the hopper and the nozzles for shutting off direct communication between said parts but having ports which are alternately brought into communication with the hopper and with the respective nozzles and provide communication alternately from said parts to the respective cylinders, a plunger in each of the cylinders for withdrawing the material from the hopper through the valve into the cylinders and discharging the material from the cylinders through the valve and nozzles, means for rotating the valve alternately in opposite directions and for simultaneously reciprocating the plungers, a table arranged at a lower level than the nozzles, traveling means on the table to feed a plurality of receiving vessels beneath the nozzles, means for intermittently operating the feeding means for the vessels, and means for adjusting the table and vessel-feeding means simultaneously to or from the nozzles.

In testimony whereof, I have hereunto signed my name at Philadelphia, Pennsylvania, this 10th day of March, 1922.

JOHN F. GEYER.

Witnesses:

James H. Bell,
E. L. Fullerton.